US011047412B1

(12) United States Patent
Basile et al.

(10) Patent No.: US 11,047,412 B1
(45) Date of Patent: Jun. 29, 2021

(54) METHODS AND SYSTEM FOR A COUPLING DEVICE

(71) Applicant: Ford Global Technologies, LLC, Dearborn, MI (US)

(72) Inventors: James M. Basile, Dundee, MI (US); Scott Willis, Gibraltar, MI (US); Kwan Jamal Barber, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/718,413

(22) Filed: Dec. 18, 2019

(51) Int. Cl.
*F16B 5/06* (2006.01)
*H02K 5/00* (2006.01)

(52) U.S. Cl.
CPC .............. *F16B 5/0621* (2013.01); *H02K 5/00* (2013.01)

(58) Field of Classification Search
CPC ............ F16B 5/0621; F16B 5/06; H02K 5/00
See application file for complete search history.

(56) References Cited

U.S. PATENT DOCUMENTS

| 4,980,589 | A | 12/1990 | Ochi et al. |
| 5,686,773 | A | 11/1997 | Sakakibara et al. |
| 5,938,169 | A | 8/1999 | Ogawa et al. |
| 6,455,968 | B2 | 9/2002 | Honorio et al. |
| 9,296,296 | B2 | 3/2016 | Sullivan et al. |
| 9,352,707 | B2 | 5/2016 | Schaffer et al. |
| 2010/0154162 | A1* | 6/2010 | Ramirez Blanco ..... F16C 35/02 16/2.1 |
| 2014/0263901 | A1* | 9/2014 | Schaffer ................. F16M 13/02 248/221.11 |

FOREIGN PATENT DOCUMENTS

JP 4743786 B2 8/2011

* cited by examiner

*Primary Examiner* — Kevin A Lathers
(74) *Attorney, Agent, or Firm* — Geoffrey Brumbaugh; McCoy Russell LLP (57) ABSTRACT

Methods and systems are provided for a coupling device. In one example, the coupling device may maintain a position of an accessory component within its mount as one or more bolts are tightened.

18 Claims, 6 Drawing Sheets

METHODS AND SYSTEM FOR A COUPLING DEVICE

FIELD

The present description relates generally to a coupling device configured to couple an accessory to an accessory mounting bracket.

BACKGROUND/SUMMARY

Vehicles comprise a variety of heavy components mounted to an engine via bolts or other fasteners. For example, an accessory, such as an alternator, may be mounted to the engine via two or more bolts. If the engine or bracket has lateral open ended slots, or if the block or cover plate is die cast, then a user may need to hold the alternator in place while the bolts are torqued.

However, the inventors have identified some issues with the approaches described above. For example, alternators and other engine accessory components are relatively heavy. Holding these accessory components in place may be difficult, and if the user is unable to hold the accessory component in place then the accessory component may fall and degrade (e.g., crack or the like). Thus a difficulty of coupling the accessory to the accessory mount may be relatively high, which may increase a manufacturing cost and decrease a manufacturing efficiency.

In one example, the issues described above may be addressed by a device comprising a plurality of tabs configured to block movement of an accessory component away from an accessory component mount. In this way, the device may hold the accessory component as its bolts are torqued.

As one example, the device is configured to allow operators to assemble accessory components, similar to automotive engine accessories, onto an engine or other mounting bracket that comprises lateral slots. The device may maintain the accessory component in place via a clip. The clip may remain in place following assembly. The clip may not interfere with a joint to which the accessory component is bolted. The device may also allow the accessory component to remain in place while the device is unbolted for service.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-9 are shown to scale, however, other relative dimensions may be used if desired.

DETAILED DESCRIPTION

Figure 1A:
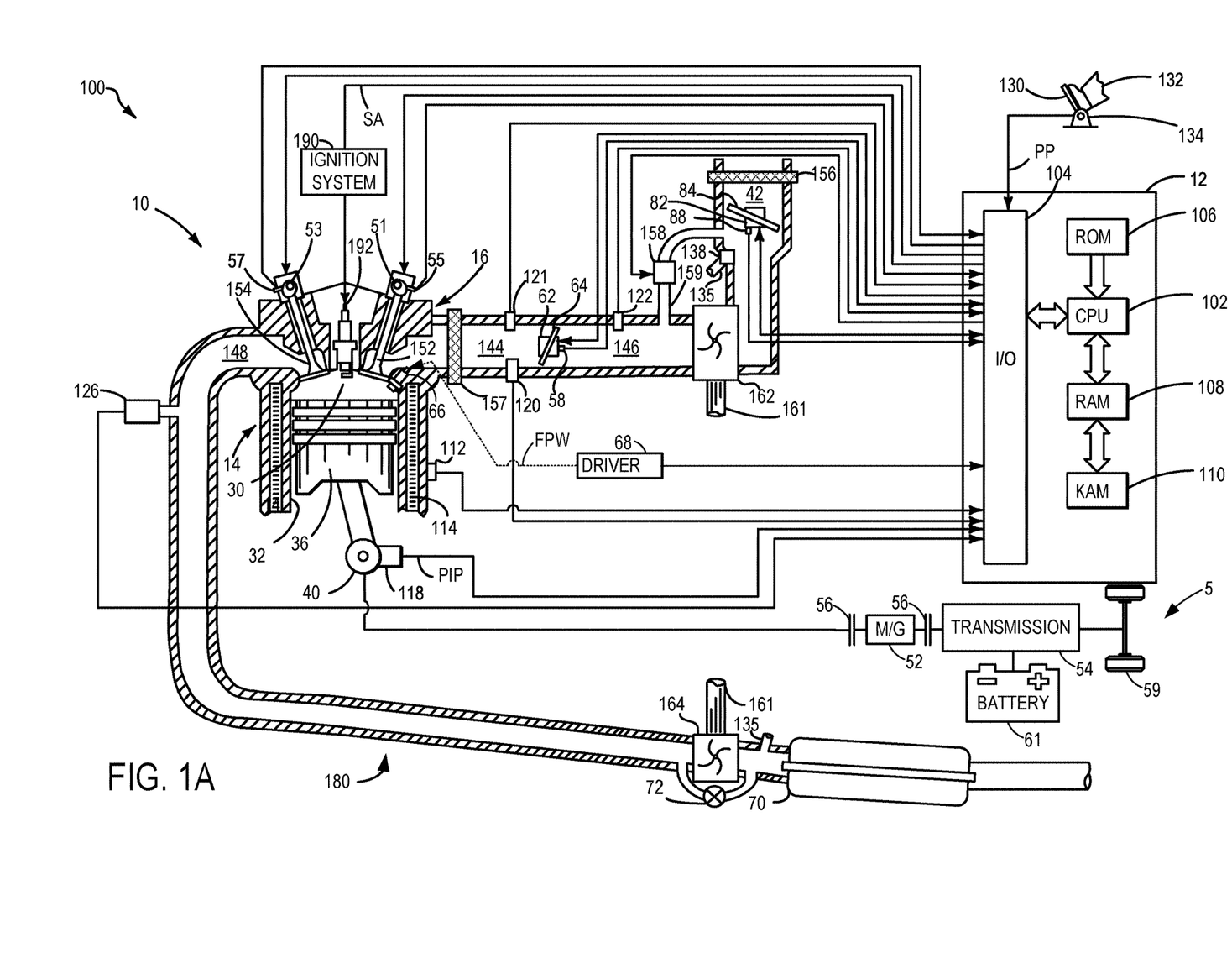
FIG. 1A illustrates an engine of a hybrid vehicle.
Figure 1B:
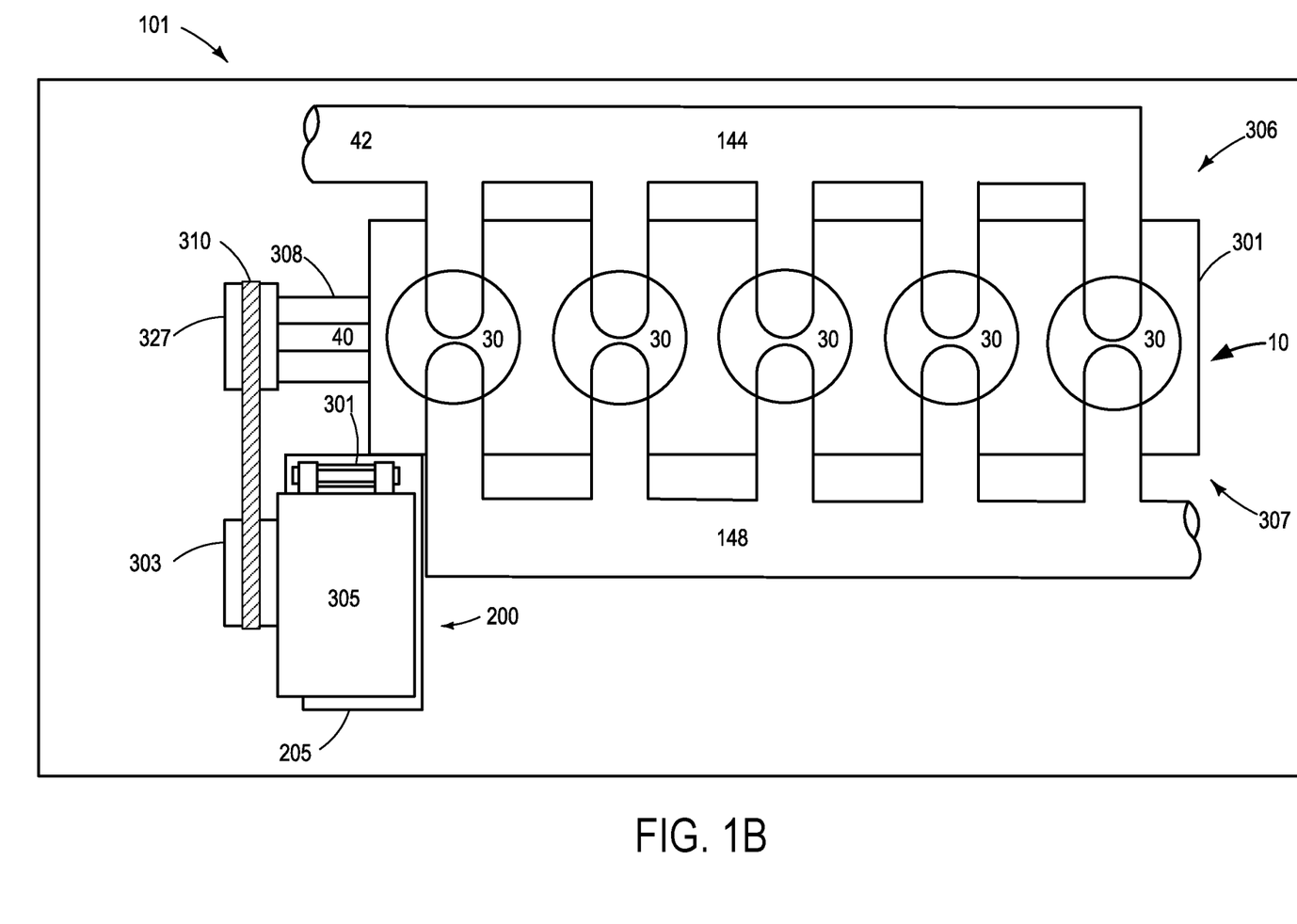
FIG. 1B illustrates an accessory component, such as an alternator, coupled to the engine
Figure 2:
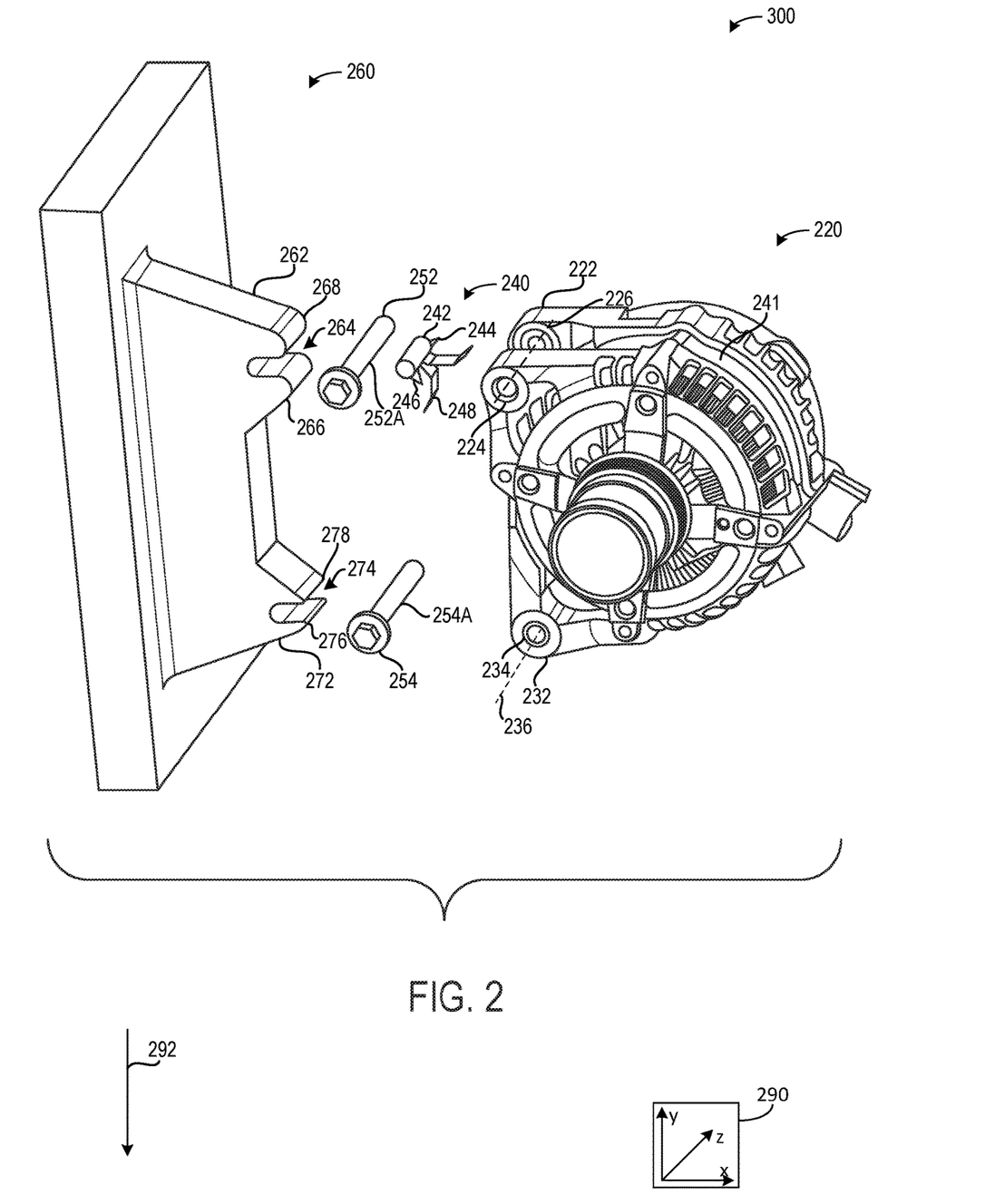
FIG. 2 illustrates a device for coupling an accessory component to an accessory component mount.
Figure 6:
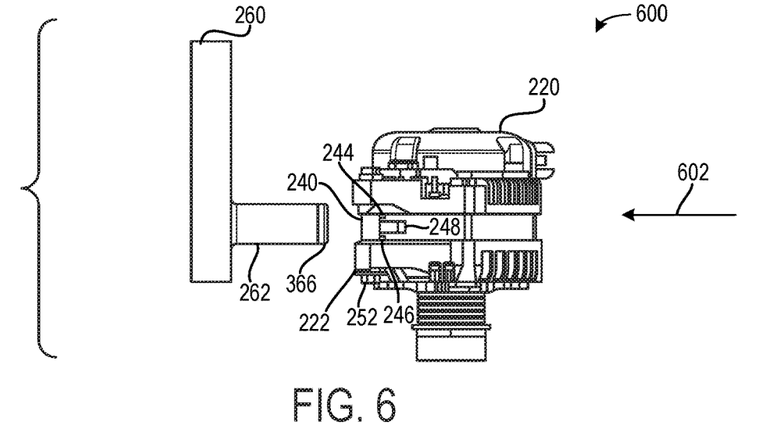
Figure 7:
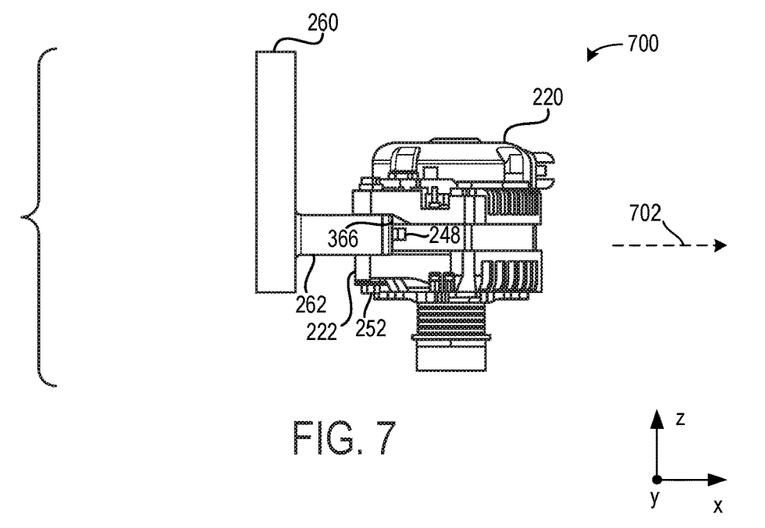
Figure 8:
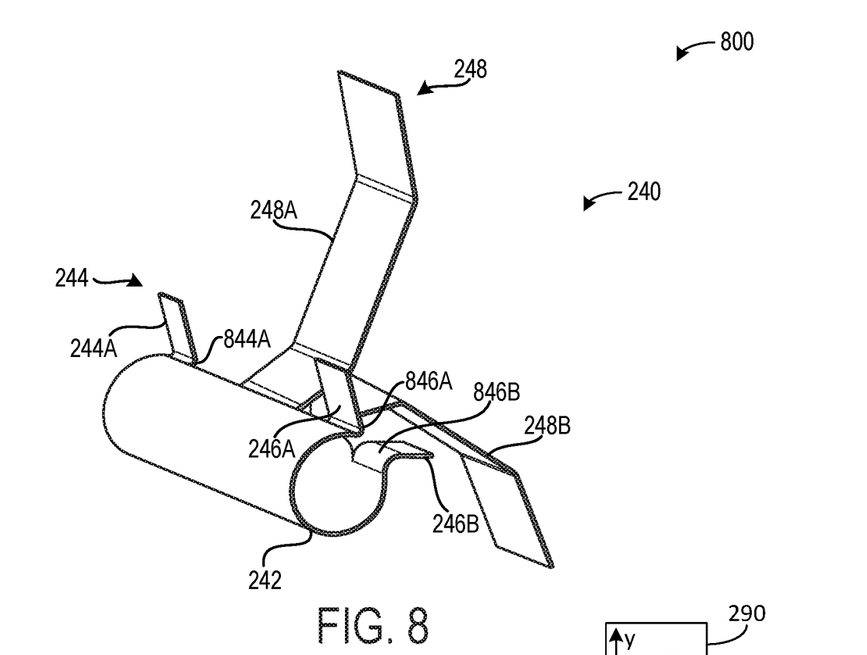
FIGS. 8 and 9 illustrate different perspective views of a clip of the device.
Figure 9:
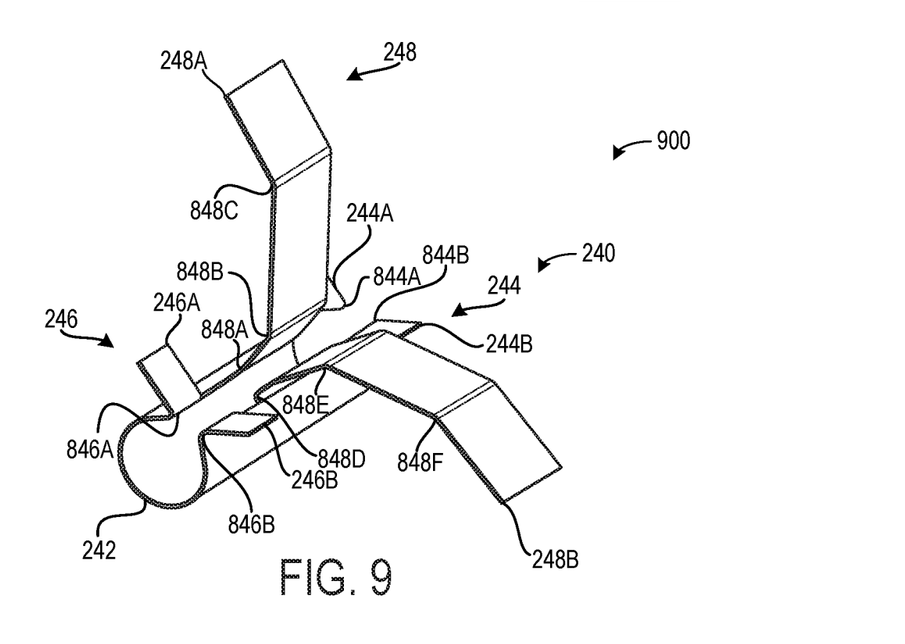

The following description relates to systems and methods for a device for mating a component with a corresponding mount. In one example, the component may be an accessory component of an engine, wherein the engine may be arranged in a hybrid vehicle as illustrated in FIG. 1A. FIG. 1B illustrates the accessory component coupled to the engine. In one example, the device is a clip configured to mate with mounting slots to assist in accessory mounting in the engine. The device, including the clip, and the accessory component and its mount are illustrated in FIG. 2. The clip may allow the accessory component to stay in place during installation of the accessory component to its mount. A progression of the accessory component engaging with the device and then to the mount is illustrated in FIGS. 3 through 7. FIGS. 8 and 9 illustrate detailed views of the clip and its features. The device may allow the accessory component, such as an alternator, to remain in place as bolts are tightened in respective mounting slots. The device may not interfere with a bolted joint following installation of the accessory component. As such, the device may optionally remain in place following installation of the accessory component. The device may allow the accessory component to remain in place during servicing of the component, wherein the servicing may include where the bolts are loosened.

FIGS. 1A-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1A depicts an engine system 100 for a vehicle. The vehicle may be an on-road vehicle having drive wheels which contact a road surface. Engine system 100 includes engine 10 which comprises a plurality of cylinders. FIG. 1A describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1A as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1A and employs the various actuators of FIG. 1A to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

FIG. 1B shows a schematic view of an accessory support structure 200 coupled to engine 10 in accordance with the present disclosure. Components previously introduced may be similarly numbered in FIG. 1B and the subsequent figures. Engine compartment 101 may include cylinder head 301, accessory support structure 200, crankshaft 40, crankshaft housing 308, intake manifold 144, exhaust manifold 148, alternator 305, and additional components.

Cylinder head 301 may be coupled to intake manifold 144 which draws air from intake passage 42 and into cylinders 30 through a plurality of intake ports and intake valves. Cylinders 30 may be further coupled to an exhaust manifold 148, which may be located internally within cylinder head 301 or externally. Cylinders 30 may export exhaust gas through a plurality of exhaust ports and exhaust valves through exhaust manifold 148. In FIG. 1B, cylinder head 301 is shown comprising 5 cylinders in a straight line orientation (it will be appreciated that this orientation may be referred to as an Inline-5 or I-5 cylinder bank). In other examples, cylinder head 301 may comprise an alternate number of cylinders, for example 4 cylinders, and may adopt a V-type or other conformation. For the inline orientation shown in FIG. 1B, the side of the cylinder head adjacent to the intake manifold may be designated as the intake side 306, and the side of the cylinder head adjacent to the exhaust manifold may be designated as the exhaust side 307. The cylinder bank may be oriented such that the long axis of the cylinder bank is perpendicular to the longitudinal axis of the vehicle (it will be appreciated that this orientation may be referred to as an east-west or transverse conformation). In another example, the long axis of the cylinder bank may be parallel to the longitudinal axis of the vehicle (it will be appreciated that this orientation may be referred to as a north-south or longitudinal conformation).

The function of components such as alternator 305 function in the way currently described. Engine 10 may include a cylinder head 301 comprising a plurality of cylinders 30 when coupled to cylinder block 302. Cylinders 30 may be coupled to crankshaft 40, allowing the energy of combustion transmitted to reciprocating motion of pistons 36 to be translated into rotational motion of the crankshaft. Crankshaft 40 is contained within crankshaft housing 308, which includes routing for crankshaft 40. Crankshaft 40 may be coupled to drive pulley 327 such that rotational motion of crankshaft 40 may be translated to rotational motion of the drive pulley. The drive pulley may be coupled to one or more drive belts, one of which is drive belt 310. Drive belt 310 may also be coupled to alternator 305 by routing over an alternator pulley 303. The one or more additional drive belts (not shown) may be further coupled to additional pulleys and accessory devices mounted on or attached to accessory support structure 200. Accessory support structure 200 may further include a crankshaft mount (not shown) for securing the bracket to crankshaft housing 308. In the present example, structure 200 is fastened directly to cylinder head 301. In another example, structure 200 may be coupled to engine 10 via the crankshaft mount, which may be secured to crankshaft housing 308. Although only alternator 305 is the only component shown in FIG. 1B, it is understood additional peripheral components may be attached to structure 200 and driven by the one or more drive belts, the components may include a power steering pump, water pump, air pump, and a compressor.

As mentioned above, in the example depicted in FIG. 1B, accessory support structure 200 may be coupled directly to cylinder head 301 through a plurality of mounting bolts and mounting bosses or other suitable fasteners. The inventors herein have recognized that a device and related method for mounting an accessory component to its respective mount on engine 10 may be utilized to protect an operator from unnecessary effort and enable a faster way to install the FEAD component. This may increase a manufacturing efficiency, decrease a manufacturing cost, and enhance servicing of the accessory component.

While the example of FIG. 1B illustrates a front-end accessory drive (FEAD) component, it will be appreciated by those of ordinary skill in the art that the device described herein may be utilized in a plurality of setting within the scope of engine accessory components and outside the scope of the engine accessory components. The device may be used in a plurality of environments where lateral mounting is utilized, wherein a lateral direction is perpendicular to a direction of gravity. The device is configured to hold an accessory component in place as it is fastened to its mount. As such, a user may no longer be forced to hold the accessory component in place, which may be difficult due to a weight and shape of the accessory component, as fasteners are aligned through receiving holes and tightened therein.

Turning now to FIG. 2, it shows an embodiment 300 of an accessory component 220, a device 240, and an accessory component mount 260. In one example, the accessory component 220 is the alternator 305 and the accessory component mount 260 is similar to the accessory support structure 200.

An axis system 290 is shown comprising three axes, namely an x-axis parallel to a horizontal direction, a y-axis parallel to a vertical direction, and a z-axis perpendicular to each of the x- and y-axes. A direction of gravity 292 is illustrated via an arrow and lies parallel to the y-axis. A lateral direction may lie within an x-z plane such that the lateral direction is perpendicular to gravity 292.

As illustrated, the accessory component mount 260 comprises a first bracket 262 distal to a second bracket 272. The first bracket 262 may comprise a first opening 264 and the second bracket 272 may comprise a second opening 274. The first opening 264 may be arranged between two or more prongs 266 of the first bracket 262. The second opening 274 may be arranged between two or more prongs 276 of the second bracket 272. The two or more prongs 266 may comprise rounded ends 268. That is to say, the ends 268 may be contoured, such that the ends 268 are free of 90 degree corners and comprise a rounded shape similar to a portion of a circle. The two or more prongs 276 may comprise pointed ends 278, wherein the ends 278 comprise an edge and more closely resemble a triangle shape.

The first bracket 262 may be vertically spaced away from the second bracket 272. In one example, the orientation of the accessory component mount 260 illustrated in the embodiment of FIG. 2 is the same as the orientation of the accessory component mount 260 in a final arrangement. Herein, the accessory component mount 260 is a mount for the alternator 305, wherein the alternator 305 is configured to engage in a lateral direction with the accessory component mount 260. Thus, the first bracket 262 is vertically above the second bracket 272.

Accessory component 220 comprises a substantially cylindrical shape. The accessory component 220 comprises two upper flanges 222 attached to an outer surface 221 of the accessory component 220. The two upper flanges 222 comprise holes 224 that share a common central axis 226 such that a first fastener 252 can fit and engage with the two upper flanges 222.

The accessory component 220 further comprises two lower flanges 232, which may be similar to the two upper flanges 222 in size and shape. The two lower flanges 232 may be located adjacent to a lower end of the alternator 305. In the example of FIG. 2, only one of the two lower flanges 232 is visible as the other lower flange is occluded from view due to a body of the accessory component 202. In one example, the two lower flanges 232 are identical to the two upper flanges 222 except that they are located on a lower side of the accessory device 220, positioned for a second fastener 254. In this way, the first fastener 252 may be a first, upper fastener and the second fastener 254 may be a second, lower fastener. The second fastener 254 may fit through holes 234 that share a common central axis 236 parallel to the common central axis 226. In one example. The common central axes 226, 236 are misaligned along at least the y-axis.

The two upper flanges 222 and the two lower flanges 232 may comprise a substantially triangular shape as they protrude from the accessory component 220 laterally toward the accessory component mount 260. The two upper and two lower flanges 222, 232 may partially deviate from the triangular shape in that their corners, which are received via the first bracket 262 and the second bracket 272, may be contoured (e.g., rounded). However, it will be appreciated that the corners may be pointed without departing from the scope of the present disclosure.

The two upper flanges 222 may be located on opposite sides of a central axis 241 that divides the cylinder of accessory component 240 into two equally sized halves, wherein the halves are divided laterally. The two lower flanges 232 may also be located on opposite sides of the central axis 241. The two upper flanges 222 may be equidistant from the central axis 241. Similarly, the two lower flanges 232 may be equidistant from the central axis 241.

First fastener 252 and second fastener 254 may physically couple the accessory component 220 to the accessory component mount 260. A shank and/or a long portion of the first fastener 252 and the second fastener 254 may span a space (e.g., a cavity) in between the two upper flanges and the two lower flanges, respectively. The long portion of the first fastener 252 spanning the cavity between the two upper flanges 222 may be received with the opening 264 of the first bracket 262. The long portion of the second fastener 254 spanning the cavity between the two lower flanges 232 may be received via the opening 274 of the second bracket 272.

First and second fasteners 252, 254 may be general fasteners, such as bolts, or other types of connectors. The first and second fasteners 252, 254 may comprise a cylindrical shape wherein a head portion may comprise a diameter larger than the long portion. Additionally or alternatively, the diameters may be equal. Herein, the first fastener 252 and the second fastener 254 are referred to as first bolt 252 and second bolt 254.

As described above, in previous examples, the accessory component 220 may be held in place while the first and second bolts 252, 254 are arranged within the first and second openings 264, 274 to mount the accessory component 220 to the accessory component mount 260. The first and second bolts 252, 254 may be tightened (e.g., torqued) to physically couple to accessory component 220 to the accessory component mount 260. In examples where the accessory component 220 is heavy, such as when the accessory component is alternator 305, it is difficult for an operator to hold the accessory component in an aligned position for the operator or another operator to torque the first and second bolts 252, 254.

The inventors have found a solution to at least partially solve these problems. A device 240 may be used to hold the accessory component 220 in place as the first and second bolts 252, 254 are tightened. The device 240 may be interchangeably referred to as the clip 240 without departing from the scope of the present disclosure.

The clip 240 may engage with the long portion 252A of the first bolt 252 within the cavity between the two upper flanges 222. The clip 240 may comprise a hollow body 242 configured to receive the long portion 252A of the first bolt 252. The hollow body 242 may comprise a substantially cylindrical shape, wherein first and second long ends of the hollow body 242 are spaced away from one another such that the hollow body 242 is open, as shown in FIGS. 8 and 9. It will be appreciated that in some examples, the clip 240 may engage with long portion 254A of the second bolt 254 and not the first bolt 252 without departing from the scope of the present disclosure. Additionally or alternatively, more than one clip may be used. In one example, only one clip is used. The clip along with the hollow body and the tabs is a single, continuous piece.

The clip 240 further comprises a plurality of first tabs 244 and a plurality of second tabs 246. The plurality of first tabs 244 and the plurality of second tabs 246 may be arranged at opposite ends of the hollow body 242. The plurality of first tabs 244 may comprise at least two tabs, wherein the tabs are oriented in opposite directions. Similarly, the plurality of second tabs 246 may comprise at least two tabs, wherein the tabs are oriented in opposite directions. As such, each of the plurality of first tabs 244 and the plurality of second tabs 246 may comprise a tab oriented vertically upward and another corresponding tab oriented vertically downward. In one example, one tab of the plurality of first tabs 244 is oriented identically to one tab of the plurality of second tabs 246. In one example, additionally or alternatively, the plurality of first tabs 244 and the plurality of second tabs 246 comprise complementary pairs, wherein each tab of the plurality of first tabs 244 comprises an identically shaped and oriented complementary pair in the plurality of second tabs 246. In this way, the plurality of first tabs 244 and the plurality of second tabs 246 are substantially identical in shape, size, and orientation.

The clip 240 further comprises a plurality of third tabs 248. The plurality of third tabs 248 may be arranged directly between the plurality of first tabs 244 and the plurality of second tabs 246. In one example, the plurality of first tabs 244 and the plurality of second tabs 246 may be equidistant to the plurality of third tabs 248. As such, the plurality of third tabs 248 may be aligned with the central axis 241.

The plurality of third tabs 248 may be identically shaped and sized. However, tabs of the plurality of third tabs may be oriented differently such that one tab is oriented vertically upward and another, corresponding tab is oriented vertically downward. In this way, each of the plurality of first tabs, second tabs, and third tabs comprises at least one tab oriented upward and another tab oriented downward.

The tabs of the plurality of third tabs 248 may be greater in size than the tabs of the plurality of first and second tabs 244, 246. In one example, the plurality of third tabs 248 are longer (e.g., greater in length which is measured along the x- and y-axes) than the plurality of first and second tabs 244, 246, while widths (measured along the z-axis) of all the tabs are substantially equal. Additionally or alternatively, the widths of the tabs may also be different.

In one example, the plurality of first, second, and third tabs are rigid and immovable. Alternatively, the tabs may be rigid while also being slightly flexible, as will be described in greater detail below. The orientation of the tabs may be such that the ends of the tabs engage with interior surfaces of the two or more prongs in an angled manner. For example, the upwardly oriented tabs of the plurality of first and second tabs may engage an interior surface of an upper prong of the two or more prongs. The downwardly oriented tabs of the plurality of first and second tabs may engage an interior surface of a lower prong of the two or more prongs, wherein the lower prong is closer to the lower bracket 272 than the upper prong. A force normal or angled to the interior surface of the prongs may be sufficient to block the accessory component 220 from being lateral displaced from the accessory component mount 260. The force of the tabs applied to the interior surface may be adjusted via modification of a shape and/or feature(s) of the tabs. For example, a contact surface between the tabs and the prongs may be increased to increase the force. Additionally or alternatively, features such as ridges, protrusions, indentations, and the like may be added to the tabs to increase the force between the tabs and the interior surfaces of the prongs.

Additionally or alternatively, plurality of first, second, and third tabs may be adjustable. For example, the two or more prongs 266 and/or the ends 268 may contact the plurality of first and second tabs and adjust their orientations such that the tabs engage with one or more of the prongs 266 and the ends 268. By doing this, the accessory component 220 may be blocked from moving laterally, thereby enabling an operator to torque the first bolt 252 without holding the accessory assembly 220.

The plurality of third tabs 248 may contact surfaces of the accessory component 248 in order to align (e.g., desirably orient) the plurality of first tabs 244 and the plurality of second tabs 246 with the first bracket 262. In one example, the plurality of third tabs 248 may not contact the first bracket 262 or other portions of the accessory component mount 260. Additionally or alternatively, in some examples, a portion of the third tabs 248 may contact the accessory component mount 260 while still aligning the plurality of first tabs 244 and the plurality of second tabs 246 with the first bracket 262.

As illustrated, the clip 240 may only engage with the first bolt 252 of the first flange 222 and the first bracket 262. In this way, a clip may not engage with the second bolt 254 or the second bracket 272. It will be appreciated that in some examples, the clip 240 may engage with the second bolt 254 and the second bracket 272 and not the first bracket 262 or the first bolt 252. Additionally or alternatively, there may be a further clip, which engages the second bolt 254 and the second bracket 272. A shape of the clip 240 and the tabs are described in greater detail below with respect to FIGS. 8 and 9.

Thus, the clip comprises a hollow body comprising a cylindrical shape, wherein the hollow body comprises a cutout along its longitudinal length such that edges of the hollow body do not touch. The plurality of first, second, and third tabs may extend from edges of the cutout, wherein tabs on different edges comprise different orientations. The orientation of the tabs may deviate from a circumferential direction of the cutout such that the tabs are angled to an original direction from which they extended from the edge. This configuration may allow the hollow body to interface with the long portion of the bolt while the tabs may engage with interior surfaces of the first bracket of the accessory component mount.

Figure 3:
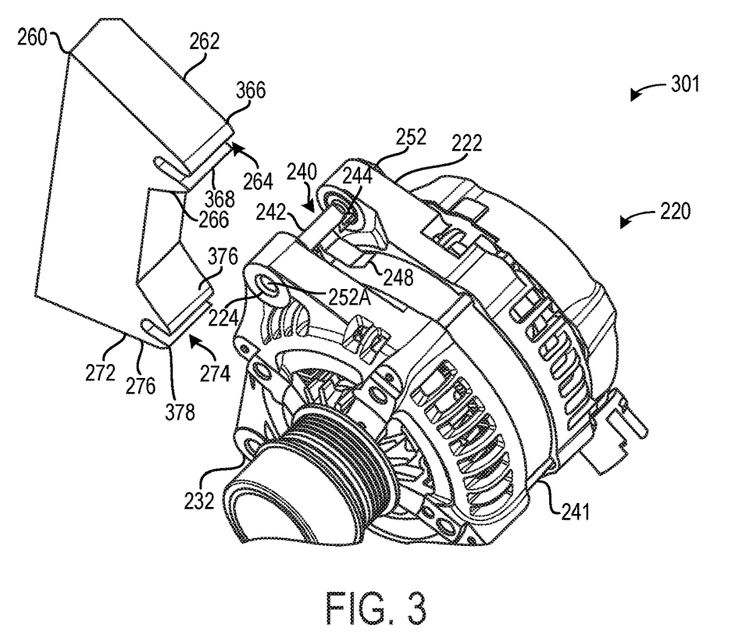
FIG. 3 illustrates the accessory component coupled to the device.
Figure 4:
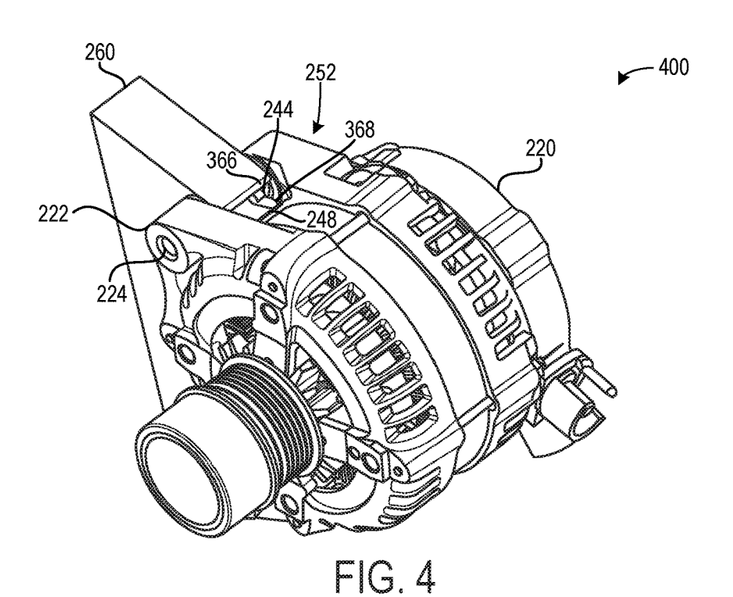
FIG. 4 illustrates the accessory component coupled to the accessory component mount via the device.
Figure 5:
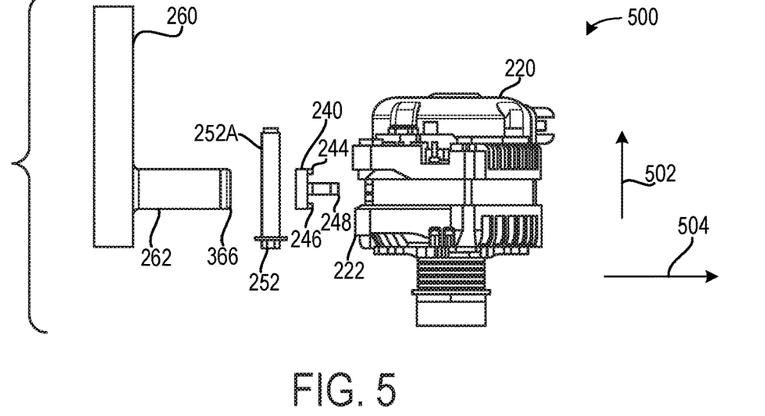
FIGS. 5-7 illustrate a top-down view of the device engaging with the accessory component and then coupling to the accessory component mount.

Turning now to FIG. 3, it shows an embodiment 301 of the clip 240 interfacing with the first bolt of the accessory component 220. FIG. 4 illustrates an embodiment 400 of the accessory component mount 260 engaging with the clip 240 and holding the accessory component 220 in place. FIGS. 5-7 illustrate a top-down view of a progression of the accessory component 220 being mounted into the accessory component mount 260 via the clip 240 and the first bolt 252. More specifically, FIG. 5 illustrates an embodiment 500 comprising each of the accessory component 220, the clip 240, the first bolt 252, and the accessory component mount 260 arranged separately from one another. FIG. 6 illustrates an embodiment 600, similar to the embodiment 301 of FIG. 3, wherein the bolt 252 is inserted through the first bracket 262 of the accessory component 220 with the clip 240 engaging with the bolt 252. FIG. 7 illustrates an embodiment 700, which is similar to the embodiment 400, wherein the accessory component mount 260 is engaging with the clip 240 and the first bolt 252 to hold the accessory component 220 in place without assistance from an operator. Herein, FIGS. 3-7 are described in tandem.

The bolt 252 may be inserted through the two upper flanges 222 via a force in a first direction 502, parallel to the z-axis. The clip 240 may engage the long portion 252A of the first bolt 252 via a force in a second direction 504. In one example, the second direction 504 is a lateral direction perpendicular to the first direction 502, wherein the first direction is a transverse direction. The clip 204 may be slightly flexible, such that its body may expand to receive the long portion 252A of the first bolt 252 and then engage with the long portion 252A in a face-sharing manner. The hollow body (e.g., hollow body 242 of FIG. 2) may extend around a majority of the long portion 252A of the first bolt 252. In one example, the hollow body surrounds greater than 90% of the long portion 252A in a circumferential direction. In some examples, additionally or alternatively, the hollow body surrounds greater than 95% of the long portion 252A in the circumferential direction.

The accessory component 220 with the first bolt 252 and the clip 240 arranged thereon may be coupled to the accessory component mount 260 via a force in a third direction 602. The third direction 602 may be opposite the second direction 504 and perpendicular to the first direction 502. The clip 240 may engage with only the first bracket 262 of the accessory component mount 260. The second bracket 272 may engage with the second bolt 254 extending through the two lower flanges 232. As illustrated, the first bracket 262 comprises an upper prong 366 and a lower prong 368 spaced apart from one another via the first opening 264. Similarly, the second bracket 272 comprises an upper prong 376 and a lower prong 378 spaced apart from one another via the second opening 274. The upper and lower prongs being configured to contact opposite sides of corresponding bolts so that the bolts may be tightened to fixedly couple the accessory component 220 to the accessory component mount 260.

In one example, the plurality of first and second tabs 244, 246 may be in contact with the upper prong 366 and the lower prong 368 of the first bracket 262. More specifically, upwardly oriented tabs of the first and second tabs 244, 246 may engage with the upper prong 366 and downwardly oriented tabs of the first and second tabs 244, 246 may engage with the lower prong 368. The plurality of third tabs 248 may contact surfaces of the accessory device to promote a desired engagement between the plurality of first and second tabs and the upper and lower prongs. The engagement between the tabs and the prongs may limit and/or block undesired movement of the accessory component 220 in a fourth direction 702, identical to the second direction 504. That is to say, inadvertent lateral movement (e.g., in the second direction 504) of the accessory component 220 may be blocked via the clip 240 and its tabs. As such, the first bolt 252 and the second bolt may be tightened (e.g., torqued) without an operator holding the accessory component 220 against the accessory component mount 260. This may increase manufacturing efficiency and improve a positioning accuracy of the accessory component 220 mounted onto the accessory component mount 260.

Turning now to FIGS. 8 and 9, they illustrate a first view 800 and a second view 900 of the clip 240, respectively. The first tabs 244 comprise a first direction tab 244A and a second direction tab 244B. The second tabs 246 comprise a first direction tab 246A and a second direction tab 246B. The third tabs 248 comprise a first direction tab 248A and a second direction tab 248B. The first direction may be opposite the second direction, wherein both directions are perpendicular and/or angled to a lateral direction. Herein, the first direction tab 244A is referred to as the upward first tab 244A, the second direction tab 244B is referred to as the downward first tab 244B, the first direction tab 246A is referred to as the upward second tab 246A, the second direction tab 246B is referred to as the downward second tab 246A, the first direction tab 248A is referred to as the upward third tab 248A, and the second direction tab 248B is referred to as the downward third tab 248B.

The upward first tab 244A and the upward second tab 246A may be substantially identical in shape and orientation. Similarly, the downward first tab 244B and the downward second tab 246B may be substantially identical in shape and orientation. The upward third tab 248A may be oriented similarly to the upward first and second tabs 244A, 246A, but the shape of the upward third tab 248A is different than the upward first and second tabs. The downward third tab 248B may be oriented similarly to the downward first and second tabs 244B, 246B, but the shape of the downward third tab 248B is different than the upward first and second tabs.

Each of the first tabs 244 and the second tabs 246 extend in a direction similar to the hollow body 242 before turning at a bend in a tangential direction relative to the hollow body 242. That is to say, the upward first tab 244A comprises an upward first tab bend 844A, wherein the bend adjusts a direction of the upward first tab 244A so that the tab is angled or perpendicular to its original direction of travel. Each of the tabs comprises a similar bend. For example, the downward first tab 244B comprises a downward first tab bend 844B which angles the downward first tab 244B relative to its original direction of travel. The upward second tab 246A comprises an upward second tab bend 846A and the downward second tab 246B comprises a downward second tab bend 846B. In one example, an angle of the bends of the first tabs 244 and the second tabs 246 is greater than or equal to 90 degrees.

Each of the third tabs 248 may comprise three bends, each of the bends adjusting an orientation of the third tabs relative to an original orientation. More specifically, the upward third tab 248A comprises a first bend 848A, a second bend 848B, and a third bend 848C. An orientation of the upward third tab 248A may be similar to the upward first tab 244A and the upward second tab 246A following the third bend 848C. As such, the first bend 848A may adjust an orientation of the upward third tab 248A to an orientation between a circumferential direction of the hollow body and the upward direction. The second bend 848B may adjust the orientation to more closely resemble the upward direction. The downward third tab 248B comprises a fourth bend 848D, a fifth bend 848E, and a sixth bend 848F. The bends of the downward third tab 248B may gradually adjust the orientation of the downward third tab 248B to match the orientations of the downward first tab 244A and the downward second tab 246B following the sixth bend 848F. In one example, an angle of the bends of the third tabs 248 between 30 to 50 degrees.

By adjusting the orientations of the tabs away from the circumferential direction of the hollow body 242, the tabs may interact with surfaces of the accessory component mount. Additionally, the bends may provide a flexibility to the tabs, wherein the third tabs 248 may be more flexible than the first tabs 244 and the second tabs 246 due to their increased number of bends.

In one example, when the clip 240 is arranged around the long portion of the bolt such that the hollow body 242 surrounds almost an entire circumference of the bolt, the accessory component may be inserted into a corresponding mount. The tabs may be compressed against a surface of a bracket of the mount (e.g., surfaces of the upper and lower prongs). The compression of the tabs may generate a compressive load which may resist lateral movement in a direction that would remove the accessory component from its mount. In one example, the compressive load prevents the accessory component from falling from the mount without a threshold force applied thereto, wherein the threshold force is greater than a gravitational force. Each of the first tabs, the second tabs, and the third tabs may contribute to the compressive force.

The third tabs 248 may comprise a second function, wherein the third tabs may further function as release tabs to enable quick removal of the accessory component from its mount. In one example, the third tabs 248 may be squeezed together which may decrease the compressive force and allow an operator to laterally removed the accessory component from its mount following loosening of the bolts.

In this way, an accessory component may be arranged in its mount and maintained within the mount without assistance from an operator. A device, which may be a clip, may hold the accessory component in place as the operator tightens one or more bolts to fasten the accessory component to the mount. The technical effect of using the device is to simplify coupling the accessory component to the mount relative to previous examples. Furthermore, an assembly efficiency may increase and an assembly cost may decrease.

In another representation, the engine is an engine of a hybrid vehicle.

An embodiment of a system, comprises a device comprising a plurality of tabs configured to block movement of an accessory component away from an accessory component mount.

A first example of the system further comprises where the plurality of tabs block movement in a lateral direction.

A second example of the system, optionally including the first example, further comprises where the plurality of tabs comprises a plurality of first tabs, a plurality of second tabs, and a plurality of third tabs.

A third example of the system, optionally including one or more of the previous examples, further comprises where each of the plurality of first tabs and the plurality of second tabs comprises at least one bend.

A fourth example of the system, optionally including one or more of the previous examples, further comprises where each of the plurality of third tabs comprises two or more bends, and wherein an angle of the two or more bends is less than an angle of the at least one bend of the plurality of the first tabs and the plurality of second tabs.

A fifth example of the system, optionally including one or more of the previous examples, further comprises where the plurality of tabs extends from a hollow body comprising a cylindrical shape, wherein the plurality of tabs comprises tabs oriented in a first direction and a second direction different than the first direction.

A sixth example of the system, optionally including one or more of the previous examples, further comprises where the hollow body surrounds a circumference of a long portion of a bolt, wherein the bolt extends through only one pair of flanges of the accessory component.

A seventh example of the system, optionally including one or more of the previous examples, further comprises where the device is a clip.

An embodiment of a device, comprising a plurality of first tabs comprising an upward first tab and a downward first tab, a plurality of second tabs comprising an upward second tab and a downward second tab, wherein the upward second tab is identical to the upward first tab and the downward second tab is identical to the downward second tab and a plurality of third tabs comprising an upward third tab and a downward third tab, wherein the plurality of third tabs are longer than the plurality of first tabs and the plurality of second tabs.

A first example of the device further comprises where the plurality of third tabs are arranged between the plurality of first tabs and the plurality of second tabs.

A second example of the device, optionally including the first example, further comprises where the plurality of third tabs comprises a greater number of bends than the plurality of first tabs and the plurality of second tabs.

A third example of the device, optionally including one or more of the previous examples, further comprises where bends of the plurality of third tabs comprise a smaller angle than bends of the plurality of first tabs and the plurality of second tabs.

A fourth example of the device, optionally including one or more of the previous examples, further comprises where the plurality of first tabs, the plurality of second tabs, and the plurality of third tabs extend from a hollow body comprising a cylindrical shape, wherein the hollow body comprises a cutout between its ends from which the plurality of first tabs, the plurality of second tabs, and the plurality of third tabs extend.

A fifth example of the device, optionally including one or more of the previous examples, further comprises where the plurality of first tabs, the plurality of second tabs, and the plurality of third tabs are flexible.

A sixth example of the device, optionally including one or more of the previous examples, further comprises where the plurality of third tabs are more flexible than the plurality of first tabs and the plurality of second tabs.

An embodiment of a system, comprising an accessory component comprising an upper flange configured to receive a first bolt and a lower flange configured to receive a second bolt, an accessory component mount comprising a first bracket configured to couple to the first bolt of the upper flange and a second bracket configured to couple to the second bolt of the lower flange, and a clip coupled to either the first bolt or the second bolt, wherein the clip is configured to block the accessory component from moving away from the accessory component mount when the first bolt and the second bolt are not tightened.

A first example of the system further comprises where the clip comprises a plurality of tabs configured to generate a force against a surface of the first bracket or the second bracket.

A second example of the system, optionally including the first example, further includes where the accessory component is an alternator and the accessory component mount is an alternator mount.

A third example of the system, optionally including one or more of the previous examples, further includes where the clip comprises a hollow body configured to surround at least a portion of a long portion of the first bolt or the second bolt.

A fourth example of the system, optionally including one or more of the previous examples, further includes where the clip is a single piece.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a clip comprising a plurality of tabs configured to block movement of an accessory component away from an accessory component mount of a powertrain component of a vehicle, wherein the plurality of tabs extends from a hollow body comprising a cylindrical shape configured to receive a fastener.

2. The system of claim 1, wherein the plurality of tabs blocks movement in a lateral direction.

3. The system of claim 1, wherein the plurality of tabs comprises a plurality of first tabs, a plurality of second tabs, and a plurality of third tabs.

4. The system of claim 3, wherein each of the plurality of first tabs and the plurality of second tabs comprises at least one bend.

5. The system of claim 4, wherein each of the plurality of third tabs comprises two or more bends, and wherein an angle of the two or more bends is less than an angle of the at least one bend of the plurality of the first tabs and the plurality of second tabs.

6. The system of claim 1, wherein the plurality of tabs comprises tabs oriented in a first direction and a second direction different than the first direction.

7. The system of claim 6, wherein the fastener is a bolt, wherein the hollow body surrounds a circumference of a long portion of the bolt, and wherein the bolt extends through only one pair of flanges of the accessory component.

8. A device for mounting an accessory component to an accessory support structure coupling to an engine, the device comprising:
a plurality of first tabs comprising an upward first tab and a downward first tab, and a plurality of second tabs comprising an upward second tab and a downward second tab, wherein the upward second tab is identical to the upward first tab and the downward second tab is identical to the downward second tab; and
a plurality of third tabs comprising an upward third tab and a downward third tab, wherein the plurality of third tabs is longer than the plurality of first tabs and the plurality of second tabs, wherein the plurality of first tabs, the plurality of second tabs, and the plurality of third tabs extend from a hollow body comprising a cylindrical shape, and wherein the hollow body comprises a cutout between its ends from which the plurality of first tabs, the plurality of second tabs, and the plurality of third tabs extend.

9. The device of claim 8, wherein the plurality of third tabs is arranged between the plurality of first tabs and the plurality of second tabs.

10. The device of claim 8, wherein the plurality of third tabs comprises a greater number of bends than the plurality of first tabs and the plurality of second tabs.

11. The device of claim 10, wherein bends of the plurality of third tabs comprise a smaller angle than bends of the plurality of first tabs and the plurality of second tabs.

12. The device of claim 8, wherein the plurality of first tabs, the plurality of second tabs, and the plurality of third tabs are flexible.

13. The device of claim 12, wherein the plurality of third tabs is more flexible than the plurality of first tabs and the plurality of second tabs.

14. A system, comprising:
an accessory component of a powertrain system of a vehicle comprising an upper flange configured to receive a first bolt and a lower flange configured to receive a second bolt;
an accessory component mount comprising a first bracket configured to couple to the first bolt of the upper flange and a second bracket configured to couple to the second bolt of the lower flange; and
a clip coupled to either the first bolt or the second bolt, wherein the clip is configured to block the accessory component from moving away from the accessory component mount when the first bolt and the second bolt are not tightened, wherein the clip comprises a plurality of tabs extending from ends of a cutout of a hollow body comprising a cylindrical shape through which the first bolt or the second bolt extends.

15. The system of claim 14, wherein the clip comprises a plurality of tabs configured to generate a force against a surface of the first bracket or the second bracket.

16. The system of claim 14, wherein the accessory component is an alternator and the accessory component mount is an alternator mount.

17. The system of claim 14, wherein the clip comprises a hollow body configured to surround at least a portion of a long portion of the first bolt or the second bolt.

18. The system of claim 14, wherein the clip is a single piece.

* * * * *